United States Patent
Romenesko et al.

(10) Patent No.: US 6,433,049 B1
(45) Date of Patent: Aug. 13, 2002

(54) FIRE RESISTANT THERMOPLASTIC SILICONE VULCANIZATES

(75) Inventors: David Joseph Romenesko; Kiersten Lynn Shephard, both of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/880,480

(22) Filed: Jun. 13, 2001

Related U.S. Application Data

(63) Continuation of application No. 09/243,039, filed on Feb. 2, 1999, now abandoned.

(51) Int. Cl.$^7$ .................................................. C08K 5/24
(52) U.S. Cl. ........................ 524/261; 524/265; 524/269; 524/456; 524/506
(58) Field of Search ................................ 524/265, 269, 524/261, 456, 506

(56) References Cited

U.S. PATENT DOCUMENTS

| | | | |
|---|---|---|---|
| 4,387,176 A | 6/1983 | Frye | 524/268 |
| 4,500,688 A | 2/1985 | Arkles | 525/431 |
| 4,714,739 A | 12/1987 | Arkles | 525/92 |
| 5,091,453 A | 2/1992 | Davidson et al. | 524/269 |
| 5,098,769 A * | 3/1992 | Nakai et al. | 428/195 |
| 5,104,920 A | 4/1992 | Keogh | 524/264 |
| 5,218,027 A | 6/1993 | Smith et al. | 524/265 |
| 5,391,594 A | 2/1995 | Romenesko et al. | 523/212 |
| 5,508,323 A | 4/1996 | Romenesko et al. | 523/212 |

FOREIGN PATENT DOCUMENTS

| | | | |
|---|---|---|---|
| CA | 2092444 | 3/1993 | C08L/83/04 |

OTHER PUBLICATIONS

Cui, et al., "Proceedings of the 2nd Beijing International Symposium/Exhibition on Flame Retardants," (1993) pp. 138–144.

Hirschler, "Fire and Materials," vol. 18, pp. 61–76 (1994).

* cited by examiner

Primary Examiner—Peter D. Mulcahy
(74) Attorney, Agent, or Firm—Alan Zombeck

(57) ABSTRACT

A composition comprising a polyolefin, a polyorganosiloxane having at least two alkenyl groups per molecule, and calcium silicate where the polyorganosiloxane is cured after mixing using an organohydrido silicon compound and a hydrosilation catalyst to create a thermoplastic vulcanizate, provides excellent fire resistance. In particular such compositions when tested by burning at 40 to 88 kW/m$^2$ external flux generate significantly less heat and smoke, and generate tougher chars compared to polyolefins alone, or mixtures of thermoplastic polyolefin resin, polyorganosiloxane and calcium silicate where the composition is not cured after mixing.

15 Claims, No Drawings

FIRE RESISTANT THERMOPLASTIC SILICONE VULCANIZATES

This application is a continuation of U.S. patent application Ser. No. 09/243,039, filed Feb. 2, 1999 abandoned.

This invention relates to thermoplastic silicone vulcanizate compositions suitable for insulation and jacketing materials for transmission media cables, and a method for making these materials. More specifically, this invention relates to thermoplastic silicone vulcanizates wherein a silicone gum or silicone base is dispersed in a thermoplastic polyolefin resin together with calcium silicate, and dynamically vulcanized therein. When burned, these thermoplastic silicone vulcanizates develop char structures with good integrity, and exhibit extremely low flame spread and smoke and heat generation properties. When the thermoplastic polyolefin resin is free from halogen groups, the materials when burned should also exhibit an acceptable toxicity level and relatively low corrosivity.

BACKGROUND OF THE INVENTION

Thermoplastic elastomers (TPEs) are polymeric materials, which possess both plastic and rubbery properties. They have elastomeric mechanical properties but, unlike conventional rubbers, they can be re-processed at elevated temperatures. This re-processability is a major advantage of TPEs over chemically crosslinked rubbers since it allows faster cycle times, recycling of fabricated parts, and results in a considerable reduction of scrap.

In general, two main types of thermoplastic elastomers are known. Block copolymer thermoplastic elastomers contain "hard" plastic segments, which have a melting point or glass transition temperature above ambient as well as "soft" polymeric segments, which have a glass transition or melt point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

A second type of thermoplastic elastomer is referred to as a simple blend (physical blend) and can be obtained by uniformly mixing an elastomeric component with a thermoplastic resin.

When the elastomeric component is also cross-linked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV). In such a material, the elastomeric component can be cured by various mechanisms, but it has been shown that the use of a non-specific catalyst, such as an organic peroxide, can also result in at least a partial cure of the thermoplastic resin itself, thereby reducing or completely destroying ability to re-process the composition (i.e., it no longer is a thermoplastic elastomer). In other cases, the peroxide can lead to the partial degradation of the thermoplastic resin. To address these problems, elastomer-specific crosslinkers, such as organohydrido silicon compounds, can be used to cure alkenyl-functional elastomers.

Arkles, in U.S. Pat. No. 4,500,688, discloses semi-interpenetrating networks (IPN) wherein a vinyl-containing silicone fluid having a viscosity of 500 to 100,000 mPa·s is dispersed in a conventional thermoplastic resin. Arkles only illustrates these IPNs at relatively low levels of silicone. The vinyl-containing silicone is vulcanized in the thermoplastic during melt mixing according to a chain extension or crosslinking mechanism, which employs a silicon hydride-containing silicone component. This disclosure states that the chain extension procedure results in a thermoplastic composition when the vinyl-containing silicone has 2 to 4 vinyl groups and the hydride-containing silicone has 1 to 2 times the equivalent of the vinyl functionality. On the other hand, silicones which predominantly undergo crosslinking reaction result in thermoset compositions when the vinyl-containing silicone has 2 to 30 vinyl groups and the hydride-containing silicone has 2 to 10 times the equivalent of the vinyl functionality. Typical thermoplastics mentioned include polyamides, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality.

In WO 96/01291 to Advanced Elastomer Systems, thermoplastic elastomers having improved resistance to oil and compression set are disclosed. These systems are prepared by first forming a cured rubber concentrate wherein a curable elastomeric copolymer is dispersed in a polymeric carrier not miscible therewith, the curable copolymer being dynamically vulcanized while this combination is mixed. The resulting rubber concentrate is, in turn, blended with an engineering thermoplastic to provide the desired TPE. Silicone rubber is disclosed as a possible elastomeric component, but no examples utilizing such a silicone are provided. Further, this publication specifically teaches that the polymeric carrier must not react with the cure agent for the curable copolymer.

Flame resistance is an important property in many applications for thermoplastics and thermoplastic elastomers. For instance flame resistance is of particular importance for materials used in coating cable used for transmission in plenums and risers in buildings. Plastic materials with insufficient flame retardant characteristics in such cable coatings can contribute to the spread of fire within a building. Furthermore, when fire burns through cable jacket and insulation the result can be the loss of the ability of the wire or optical fiber to communicate.

There have been numerous attempts in the prior art to provide flame retardant thermoplastics. Typically it has been necessary to heavily fill the thermoplastic material with additives such as inorganic fillers until the desired degree of flame retardancy has been achieved. However, this results in several disadvantages, as large proportions of additives could normally be expected to detract from the physical properties of the base.

In wire and cable jackets another approach to reduce to flame spread and smoke evolution is the use of fluoropolymers. These, together with layers of other materials, have been used to control char development, jacket integrity and air permeability to minimize restriction on choices of materials for insulation within the core. Commercially available fluorine-containing polymer materials have been accepted as the primary insulative coating for conductors and as a jacketing material for plenum cable without the use of metal conduit. However, fluoropolymer materials are somewhat difficult to process. Also, some of the fluorine-containing materials have relatively high dielectric constant, which makes them unattractive for communication media.

Further, a fluoropolymer is a halogenated material. There has been a desire to overcome some problems, which exist with respect to the use of halogenated materials such as fluoropolymers and polyvinyl chloride (PVC). These materials promote undesired levels of corrosion in fires. If a fluoropolymer is used, hydrogen fluoride forms under the influence of heat, causing corrosion. For PVC, hydrogen chloride is formed.

The use of silicones as additives to non-halogenated thermoplastics has been proposed for improving fire retardant characteristics.

Frye in U.S. Pat. No. 4,387,176 proposed a flame retardant thermoplastic composition comprised of 50 to 97 percent by weight of a thermoplastic, 1 to 40 percent of a silicone base such as linear silicone fluid or gum, 1 to 20 percent of a metal organic compound such as magnesium stearate, and 1 to 20 percent of a silicone resin such as MQ resin.

Cui et. al in *Proc. Beijing Int. Symp. Exhib. Flame Retard*, (1993) pp 138–44, describes the use of silicone oil in EPDM rubber filled with aluminum trihydrate (ATH). EPDM is a terpolymer composed of ethylenic, propylenic moieties and a ethylidene norborene monomer. The silicone oil was not compatible with EPDM rubber, making it necessary to premix the oil with the ATH before addition to the EPDM. A crosslinking agent, referred to as DCP but not described, was found to be important to improved fire resistance.

Smith et al. in U.S. Pat. No. 5,218,027 describes a fire retardant composition comprising 5% to 60% by weight of an olefinic copolymer or terpolymer wherein 3% to 20% by weight of the copolymer or terpolymer is a carboxylic acid co-monomer; 1% to 15% by weight or an polyorganosiloxane; and 10% to 85% by weight of a flame-retardant additive comprising a group I or group II or group III metal oxide hydrate. Smith teaches that the silicone aids in incorporation of the flame-retardant additive.

Romenesko et al. in U.S. Pat. Nos. 5,391,594, and in 5,508,323 disclose a method of imparting fire retardancy to a thermoplastic polyolefin resin by modifying the resin with silicone polymer powder. The thermoplastic resin is preferably selected from polystyrene, high impact polystyrene, polypropylene, polycarbonate or poly(phenylene ether). The silicone polymer powder has an average particle size of 1 to 1 000 microns and consists essentially of 100 parts by weight of a polyorganosiloxane fluid or gum, and from 10 to 150 parts by weight of a silica filler, and no curing agent is described.

SUMMARY OF THE INVENTION

We have discovered that a composition comprising a polyolefin, a polyorganosiloxane having at least two alkenyl groups per molecule, and calcium silicate, where the polyorganosiloxane is cured after mixing using an organohydrido silicon compound and a hydrosilation catalyst to create a thermoplastic vulcanizate, provides excellent fire resistance. In particular, such compositions, when tested by burning at 40 to 88 kW/m$^2$ external flux generate significantly less heat and smoke, and generate tougher chars compared to polyolefins alone, or to mixtures of polyolefin, polyorganosiloxane and calcium silicate where the polyorganosiloxane is not cured after mixing.

DETAILED DESCRIPTION OF THE INVENTION

This invention is a method of preparing a thermoplastic vulcanizate, the method comprising:
(I) mixing
  (A) 100 parts by weight of a polyolefin,
  (B) 5 to 350 parts by weight polyorganosiloxane having an average of at least 2 alkenyl radicals per molecule,
  (C) an organohydrido silicon compound which contains an average of at least 2 silicon-bonded hydrogen groups per molecule,
  (D) a hydrosilation catalyst,
  (E) optionally, a reinforcing filler, and
  (F) 10 to 170 parts by weight of calcium silicate, preferably wollastonite having an average particle size of 2 to 30 µm; and
(II) dynamically curing said polyorganosiloxane (B).

This invention is also the thermoplastic silicone vulcanizate (TPSiV) composition resulting from the above process.

This invention is also a transmission media cable, which has a thermoplastic vulcanizate coating where the thermoplastic vulcanizate is made by the process above.

Component (A) is a thermoplastic thermoplastic polyolefin resin or a blend of two or more such resins. Preferably, the thermoplastic polyolefin resin is selected from polypropylene and polyethylene. TPSiV compositions of the present invention may be compounded with from about 16 weight percent to about 84 weight percent Component (A), based on the total weight of the composition. It is preferred to use about 25 weight percent to 50 weight percent of Component (A) based on the total weight of the composition for most thermoplastic vulcanizate applications.

The preferred thermoplastic polyolefin resin may be selected from homopolymers of olefins as well as interpolymers of one or more olefins with each other and/or up to about 40 mole percent of one or more monomers which are copolymerizable with the olefins. Examples of suitable polyolefins include homopolymers of ethylene, propylene, butene-1, isobutylene, hexene, 1,4-methylpentene-1, pentene-1, octene-1, nonene-1 and decene-1, inter alia. These polyolefins can be prepared using peroxide, Ziegler-Natta or metallocene catalysts, as well known in the art. Interpolymers of two or more of the above mentioned olefins may also be employed as Component (A) and they may also be copolymerized with, e.g., vinyl or diene compounds or other such compounds which can be copolymerized with the olefins.

Specific examples of suitable interpolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and interpolymers of ethylene with two or more of the above mentioned olefins.

The thermoplastic polyolefin may also be a blend of two or more of the above-mentioned homopolymers or interpolymers. For example, the blend can be a uniform mixture of one of the above systems with one or more of the following: polypropylene, high pressure, low density polyethylene, high density polyethylene, polybutene-1 and polar monomer-containing olefin copolymers such as ethylene/acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers.

Preferred polyolefins include polyethylene (PE) polymers such as low pressure, substantially linear, ethylene homopolymers and interpolymers of ethylene with alpha-olefins having 3 to 10 carbon atoms, such interpolymers being known as linear low density polyethylene (LLDPE) in the art. Preferably, these systems have a density of about 0.85 to 0.97 g/cc, more preferably 0.875 to 0.930 g/cc, and weight average molecular weight of about 60,000 to about 1,000,000.

Other preferred polyolefins include polypropylene (PP) resins, including atactic, syndiotactic or isotactic PP. These are typically homopolymers of propylene or interpolymers of propylene with minor proportions of ethylene. Such PP systems can have the ethylene polymerized randomly with propylene units or a number of ethylene units may be linked to form a block copolymer.

The above polymers and interpolymers are well known in the art and further description thereof is considered unnecessary.

Polyorganosiloxane (B) is a high consistency (gum) polymer or copolymer which contains at least 2 alkenyl radicals having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the polyorganosiloxane gum.

The remaining (i.e., non-alkenyl) silicon-bonded organic groups in component (B) are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, or course, that these groups are selected such that Component (B) has a glass temperature (or melt point) which is below room temperature and the gum is therefore elastomeric. Methyl preferably makes up at least 85, more preferably at least 90, mole percent of the non-unsaturated silicon-bonded organic groups in component (B).

Thus, polydiorganosiloxane (B) can be a homopolymer, a copolymer or a terpolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of polyorganosiloxane (B) include: trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked polydimethylsiloxanes; dimethylvinylsiloxy-endblocked dimethylsiloxane-methylvinylsiloxane copolymers; dimethylvinylsiloxy-endblocked polyphenylmethylsiloxanes; dimethylvinylsiloxy-endblocked methylphenylsiloxane-dimethylsiloxane-methylvinylsiloxane copolymers; and similar copolymers wherein at least one end group is hydroxydimethylsiloxy. Preferred systems for low temperature applications include phenylmethylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (B) may also consist of combinations of two or more polyorganosiloxanes. Most preferably, component (B) is a polydimethylsiloxane homopolymer, which is terminated with a vinyl group at each end of its molecule or is such a homopolymer, which also contains at least one vinyl group along its main chain.

For the purposes of the present invention, it is preferred that the molecular weight of the polyorganosiloxane gum is sufficient to impart a Williams plasticity number of at least about 30 as determined by the American Society for Testing and Materials (ASTM) 926. The plasticity number, as used herein, is defined as the thickness in millimeters×100 of a cylindrical test specimen 2 $cm^3$ in volume and approximately 10 mm in height after the specimen has been subjected to a compressive load of 49 Newtons for three minutes at 25° C. Although there is no absolute upper limit on the plasticity of component (B), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear polyorganosiloxanes in the presence of similar alkenyl-functional species.

The organohydrido silicon compound (C) is a crosslinker (cure agent) for polyorganosiloxane (B) of present composition and is a silicon compound which contains at least 2 silicon-bonded hydrogen atoms in each molecule, but having at least about 0.2 weight percent hydrogen, preferably 0.2 to 2 and most preferably 0.5 to 1.7, weight percent hydrogen bonded to silicon. The remaining valences of the silicon atoms are satisfied by divalent oxygen atoms or by monovalent hydrocarbon radicals comprising one to 20 carbon atoms. The monovalent hydrocarbon radicals can be, for examples, alkyls such as methyl, ethyl, propyl, tertiary butyl, and hexyl; cylcoalkyls such as cyclohexyl; and aryls such as phenyl and tolyl. Those skilled in the art will appreciate that either Component (B) or Component (C), or both, must have a functionality greater than 2 if polyorganosiloxane (B) is to be cured (i.e., the sum of these functionalities must be greater than 4 on average). The position of the silicon-bonded hydrogen in Component (C) is not critical, and it may be bonded at the molecular chain terminals, in non-terminal positions along the molecular chain or at both positions. The silicon-bonded organic groups of Component (C) are independently selected from any of the hydrocarbon or halogenated hydrocarbon groups described above in connection with Component (B), including preferred embodiments thereof. The molecular structure of Component (C) is also not critical and is exemplified by straight-chain, partially branched straight-chain, branched, cyclic and network structures, linear polymers or copolymers being preferred.

Component (C) is exemplified by low molecular siloxanes, such as $PhSi(OSiMe_2H)_3$; trimethylsiloxy-endblocked polyhydridomethylsiloxanes; trimethylsiloxy-endblocked dimethylsiloxane-methylhydridosiloxane copolymers; dimethylhydridosiloxy-endblocked polydimethylsiloxanes; dimethylhydrogensiloxy-endblocked polymethylhydrogensiloxanes; dimethylhydridosiloxy-endblocked dimethylsiloxane-methylhydridosiloxane copolymers; cyclic polymethylhydrogensiloxanes; cyclic dimethylsiloxane-methylhydridosiloxane copolymers; tetrakis(dimethylhydrogensiloxy)silane; silicone resins composed of $(CH_3)_2HSiO_{1/2}$, $(CH_3)_3SiO_{1/2}$, and $SiO_{4/2}$ units; and silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units, wherein Me and Ph herein a denote methyl and phenyl radicals, respectively.

Particularly preferred organohydrido silicon compounds are polymers or copolymers with RHSiO units ended with either $R_3SiO_{1/2}$ or $HR_2SiO_{1/2}$, wherein R is independently selected from alkyl radicals having 1 to 20 carbon atoms, phenyl or trifluoropropyl, preferably methyl. It is also preferred that the viscosity of Component (C) is about 0.5 to 1,000 mPa·s at 25° C., preferably 2 to 500 mpa·s. Further, this Component preferably has 0.5 to 1.7 weight percent hydrogen bonded to silicon. It is highly preferred that Component (C) is selected from a polymer consisting essentially of methylhydridosiloxane units or a copolymer consisting essentially of dimethylsiloxane units and methylhydridosiloxane units, having 0.5 to 1.7 weight percent hydrogen bonded to silicon and having a viscosity of 2 to 500 mPa·s at 25° C. Such a highly preferred system will have terminal groups selected from trimethylsiloxy or dimethylhdridosiloxy groups.

Component (C) may also be a combination of two or more of the above described systems. The organohydrido silicon Component (C) is used a level such that the molar ratio of SiH therein to Si-alkenyl in Component (B) is greater than 1 and preferably below about 50, more preferably 3 to 20, most preferably 6 to 12.

Hydrosilation catalyst (D) is a catalyst that accelerates the cure of polyorganosiloxane (B) in the present composition. This hydrosilation catalyst is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinuim/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (D) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al., these patents being hereby incorporated by reference. Most preferably, catalyst (D) is a neutralized complex of platinous chloride and divinyltetramethyldisiloxane.

Component (D) is added to the present composition in a catalytic quantity sufficient to promote the reaction of Components (B) and (C) and thereby cure the polyorganosiloxane. For example, the catalyst is typically added so as to provide about 0.1 to 500 parts per million (ppm) of metal atoms based on the total weight of the thermoplastic elastomer composition, preferably 0.25 to 50 ppm.

Component (E) is an optional reinforcing silica filler, which can be any silica filler which is known to reinforce polydiorganosiloxane, and is preferably selected from finely divided, fumed and precipitated forms of silica and silica aerogels having a specific surface area of at least about 50 $m^2/g$, and preferably 150 to 400 $m^2/g$. The filler is added by mixing it first with the polyorganosiloxane to form an organosiloxane base. The optional reinforcing silica filler is typically added at a level of about 1 to 65 weight percent of the organosiloxane base and preferably in a range of 10 to 65 weight percent of the base.

The reinforcing silica filler may be treated to render its surface hydrophobic, as typically practiced in the silicone rubber art. This can be accomplished by reacting the reinforcing silica filler with a liquid organosilicon compound, which contains silanol groups or hydrolyzable precursors of silanol groups. Compounds that can be used as filler treating agents include such ingredients as low molecular weight liquid hydroxy- or alkoxy-terminated polydiorganosiloxanes, including $\alpha,\omega$-silanediols, hexaorganodisiloxanes, cyclodimethylsiloxanes and hexaorganodisilazanes.

Component (F) is calcium silicate, preferably a wollastonite with a particle size of 2 to 30 $\mu$m. Wollastonite is a mined form of calcium silicate ($CaSiO_3$), having an acicular morphology, (i.e., a needle-like shape). Typically, this mineral has an aspect ratio (length:diameter) of 3:1 or greater. It is preferred particle size of from about 5 to 15 $\mu$m and an average aspect ratio greater than about 15:1. Wollastonite is preferred over calcium silicates of other shapes and morphologies because the char formation has good integrity and hardness. Good char formation on exposure to high heat flux is especially important in cable jacketing applications for preventing flame propagation and maintaining the ability of the transmission media to communicate. Preferred wollastonite is supplied by NYCO® Minerals, Inc., Willsboro N.Y. The calcium silicate is added at a rate of about 10 to 170 parts by weight based on 100 parts by weight of Component (A). Better char structure is formed on burning when the calcium silicate is added at a rate above 25 weight percent, based on the total formulation. The upper limit of calcium silicate that is useful will depend on the properties desired in the uncured and cured composition. Generally, calcium silicate present at greater than about 60 percent by weight of the total formulation results in uncured compositions that are too stiff and therefore difficult to process.

In addition to the above mentioned major Components (A) though (F), a minor amount (i.e., less than 50 weight percent of the total composition) of an optional additive can be incorporated in the TPSiV compositions of the present invention. This optional additive can be illustrated by, but are not limited to, extending fillers such as quartz, calcium carbonate, and diatomaceous earth; pigments such as iron oxide and titanium oxide, electrically conducting fillers such as carbon black and finely divided metals, heat stabilizers such as hydrated cerric oxide, and more traditional flame and smoke retardants such as halogenated hydrocarbons, alumina trihydrate, magnesium hydroxide, and organophosphorous compounds. These additives are typically added to the final TPSiV composition after dynamic cure, but they may also be added at any point in the preparation provided they do not interfere with the dynamic vulcanization mechanism.

According to the method of the present invention, the thermoplastic elastomer is preferably prepared by thoroughly dispersing polyorganosiloxane (B) and calcium silicate (F), and optionally Component (E), in thermoplastic (A) and dynamically vulcanizing the polyorganosiloxane using Component (C) and Component (D). Mixing is carried out in any device which is capable of uniformly dispersing the components in the resin, such as an internal mixer or a twin-screw extruder, the latter being preferred for commercial preparations wherein the temperature is preferably kept as low as practical consistent with good mixing so as not to decompose the resin. Order of mixing is not critical and, for example, Components (B),(C),(E) and (F) can be separately introduced and mixed with the thermoplastic polyolefinresin before dynamic vulcanization begins. Components (B) (C), and (E), should be well dispersed in thermoplastic (A) before catalyst (D) is added and dynamic vulcanization begins. Component (F) may be added before or after the crosslinking begins. Optimum temperatures, mixing times and other conditions of the mixing operation depend upon the particular resin and other components under consideration and these may be determined by routine experimentation by those skilled in the art.

In a preferred mixing procedure, an organosiloxane base comprising Components (B) and (E) are mixed in with melted thermoplastic polyolefinresin (A) in an internal mixer at a controlled temperature which is above the melt point to about 100° C. above the melt point of the resin for about 2 to 10 minutes. Thus, for example, this range is from the respective melt point of the resin to 200° C. for PP and PE. The cure agent (C) and catalyst (D) are then added, followed by the calcium silicate (F). As mixing is continued and the silicone gum is dynamically vulcanized for a time sufficient to again establish a steady state melt viscosity, typically about 1 to 30 minutes.

The thermoplastic silicone vulcanizate prepared by the above described method can then be processed by conventional techniques, such as extrusion, vacuum forming, injection molding, blow molding or compression molding, to fabricate plastic parts. Moreover, these compositions can be re-processed (recycled) with little or no degradation of mechanical properties.

The novel thermoplastic silicone vulcanizates of the present invention can be used, for example, for wire and cable insulation, sealing, automotive and appliance components, belts and hoses, construction seals, bottle closures and general rubber applications.

The materials formed from the method of the present invention have exceptional flame resistance. In the preferred embodiment, they form hard chars, with minor or no cracking, and have peak heat release of less than 180 kW/m$^2$ when tested at 40 kW/m$^2$ in a cone calorimeter under ASTM E1354. When tested at higher heat fluxes, up to 88 kW/m$^2$, the materials formed with the method of this invention continue to have good char, with peak heat release rates less than 460 kW/m$^2$. In the test, the material at the bottom of the cone sample remains relatively unaffected by the test.

Transmission media cables of the present invention are made by using the thermoplastic silicone vulcanizate as insulation on wires or fibers or as jacket coverings. The method used for coating the thermoplastic silicone vulcanizate is not critical. Typically coating is done using a screw type extruder.

EXAMPLES

In order to qualify for use as plenum cable jacketing or insulation, materials must undergo severe flammability testing. In the United States, the major test is, UL 910 also known as the Steiner Tunnel test, an extraordinarily difficult test to pass, which measures flame spread along the wire, peak smoke extinction and total smoke, all caused by heat flux of 87.9 kW/m$^2$ generated by a methane flame. In the United Kingdom, an important test is British Standard 6387 which is a test having a burner ranging from 400 to 940 C impinging on the wire while measuring electrical communication. In both these tests, char formation and hardness of the char affect the result.

Both the UL 910 test and BS6387 are difficult and expensive to run, requiring large amounts of cable and coating material. In addition, they require specialized testing facilities to accommodate the environment. This makes it difficult to test multiple samples. It is understood in the field of fire research that the heat release rate of a product is the most important property in predicting hazard in a fire situation, because it controls the intensity of a fire. It has also now been established that fire test results from the cone calorimeter correlate with those from full-scale fire. See, for example, Marcelo M Hirschler, "Comparison of Large-and Small-scale Heat Release Tests with Electrical Cables," *Fire and Materials, Vol.* 18, 61–87 (1994). These efforts suggest that a cone calorimeter instrument which measures heat release rate, run with a heat flux of 88 kilowatts, is a test that is useful for screening materials for their suitability in plenum cable coating.

In the following examples, heat release rates were determined by a cone calorimeter. In the cone calorimeter, a conical electrical burner is positioned above the sample to emit a defined heat flux towards the sample. A spark igniter is situated above the sample's surface is used to ignite the volatile gasses being distilled from the sample. When the volatiles ignite, the time until ignition is recorded and the spark igniter is turned off. The oxygen concentration in the flue as a function of time is measured to determine the heat release rate. This is based on the principle that, for most plastics, a constant amount of heat is released per unit mass of oxygen consumed in combustion. This calorimeter is an oxygen consumption calorimeter, ASTM E1354. Given that the oxygen concentrations are far more easily determined than the heat output over time, the oxygen depletion calorimeter provides an easy way to determine the heat release rate of materials.

Materials

The following materials were used in the examples below.
Polyolefins
  LLDPE—Engage 8401 Linear Low Density Polyethylene, having a density of 0.87 g/cc and a melt flow index (MFI) of 5. DuPont Dow Elastomers L.L.C., Wilmington Del.
  PP—Amoco 4018 Poly propylene homopolymer, having a density of 0.906 g/cc and a melt flow index of 13.5, Amoco Chemical Company, Chicago, Ill.
Polyorganosiloxane
  PDMS 1 Dimethylvinylsiloxy-terminated dimethyl-methylvinyl siloxane copolymer gum having Williams plasticity of 140 to 165.
Organosiloxane Bases
  Optional silica was added by first making a base, comprising silica, a polyorganosiloxane, and a plasticizer for Base 1 and Base 2. Base 3 was made by reacting a silica, a plasticizer, and an organosilane and then adding these to a polyorganosiloxane
  BASE 1—26% Amorphous Silica; 68% Dimethylvinylsiloxy-terminated dimethyl-methylvinyl siloxane copolymer gum having a Williams plasticity of 140 to 165; 5% Hydroxy-terminated polydimethylsiloxane BASE 2—18% Amorphous Silica; 74% Dimethylvinylsiloxy-terminated dimethyl-methylvinyl siloxane copolymer gum having a Williams plasticity of 140–165; 5% Hydroxy-terminated polydimethylsiloxane BASE 3—48% Reaction product of silica, hydroxy-terminated polydimethyl siloxane, and methacryloxypropyltrimethoxysilane , and 52% Dimethylvinylsiloxy-terminated dimethyl-methylvinyl siloxane copolymer having a Williams plasticity of 140–165. This is a silicone powder formulation such as those disclosed in U.S. Pat. No. 5,391,594, and in U.S. Pat. No. 5,508,323, cited above.

Organohydrido Silicon Compound

CROSSLINKER—Trimethylsiloxy-terminated dimethyl, methyl hydrogen having a viscosity of approximately 30 mPa·s at 25° C. and 10,000 ppm by weight silicon bonded H.

Hydrosilation Catalyst

CATALYST (Contains 0.49 to 0.55 wt % platinum) 1.5% of 1,3-Diethenyl-1,1,3,3 -Tetramethyldisiloxane Complexes of Platinum in a carrier of Dimethylvinyl-terminated polydimethylsiloxane Calcium Silicate CALCIUM SILICATE 1—Nyad G Special, Nyco Minerals, Willsboro N.Y.

CALCIUM SILICATE 2—Celite C from World Minerals Inc., Lompoc, Calif.

Sample Preparation

Preparation of thermoplastic silicone vulcanizates of the invention, and comparative examples, was carried out in a 300 ml Haake internal mixer equipped with roller blades. Temperature for the examples was 150 C.–170 C. and 60 RPM's. For all crosslinked examples, 4.2 gm of CROSSLINKER and 6 drops (approx. 0.5 gm) of CATALYST were added. In a typical procedure, the thermoplastic polyolefinresin was added to the pre-heated mixer and melted for about 2–3 minutes. The polydiorganosiloxane gum (or silicone base) was added and mixed for 2–10 minutes whereupon the CROSSLINKER and CATALYST were added and mixing was continued to allow dynamic vulcanization of the silicone component. Alternatively, the base was added first and the resin was mixed therewith before addition of the CROSSLINKER and CATALYST. Mixing time following addition of CROSSLINKER and CATALYST was 12–20 minutes. Through out the whole process, a steady stream of N2 is injected into the top of the Haake bowl mixer to minimize any oxygen degradation.

After a given thermoplastic silicone vulcanizate was prepared according to the above procedure, the composition was compression molded for about 5–10 minutes at the indicated temperature and allowed to cool under pressure to provide slabs having a thickness of about 1–2 mm. The slabs were stored at room temperature at least 16 hours and were then cut into dumbbells using an ASTM die having a test length of 25.4 mm and test width of 3.2 mm. Three such samples were tested by a method similar to ASTM D 412 using a Sintech™ machine (MTS Systems, Corp, Research Triangle Park, N.C.) at a test speed of 50 mm/min. The average value of the tensile and elongation were calculated based on 3 bars each.

In a similar manner as above, 100×100 mm slabs were prepared by first making a large slab approximately 6.5 mm thick. This slab was then cut to 100×100 mm. These slabs were used in ASTM 1354 Cone Calorimeter analysis. The fixture used in the Cone test had a metal housing with a small overlap of about 2 mm on each side of the sample. Two small wire rods about 1 mm in diameter and 100 mm long were used to hold the sample in place in the metal housing to minimize the rise of the sample under the external heat flux stress.

Durometer was determined with either a Shore A (soft) or Shore D (hard) test instrument (Shore Instrument & Mfg. New York, N.Y.)

EXAMPLE 1

Samples of several formulations were screened by burning in a cone calorimeter at 40 kW/m2. Samples were evaluated based on lowest Peak HRR and the longest time to peak HRR with minimum smoke numbers, and observations were made on the char formed. The formulations and results are recorded in Table 1. All parts (pts) and percents are recorded by weight. Samples 1-4, 1-12, 1-14, 1-15, and 1-18 represent compositions of the present invention.

TABLE 1

Comparison of materials at 40 kW/m$^2$

| Sample Ref. | Formulation | Peak/Peak Smoke HRR (sec) | Descriptive Result |
|---|---|---|---|
| 1-1 | 100% LLDPE (no CROSSLINKER or CATALYST) | 2661 kW/m$^2$ (192 sec) Peak Smoke = 6.9 | No Char, complete burn |
| 1-2 | 60 gm LLDPE/140 gm PDMS 1 CROSSLINKER, CATALYST | 505 kW/m$^2$ (288 sec) Peak Smoke = 13 | Material completely burned with silica char but no stiffness |
| 1-3 | 60 gm LLDPE/140 gm BASE 1 CROSSLINKER, CATALYST | 145 kW/m$^2$ (577 sec) Peak Smoke = 2 | Shrinkage and cracks, lot of silica on surface - stiff |
| 1-4 | 60 gm LLDPE/46.8 gm PDMS 1 93.2 gm CALCIUM SILICATE 1, CROSSLINKER, CATALYST | 134 kW/m$^2$ (616 sec) Peak Smoke = 0.9 | Very tough char, no cracks to bottom, entire sample intact |

TABLE 1-continued

Comparison of materials at 40 kW/m$^2$

| Sample Ref. | Formulation | Peak/Peak Smoke HRR (sec) | Descriptive Result |
|---|---|---|---|
| 1-5 | 100% PP (no CROSSLINKER or CATALYST) | 1882 kW/m$^2$ (140 sec) Peak Smoke = 4.8 | No Char, complete burn |
| 1-6 | 95% PP/5% BASE 3 (no CROSSLINKER or CATALYST) | 1069 kW/m$^2$ (128 sec) Peak Smoke = 5.0 | Fluffy Char |
| 1-7 | 95% PP/5% of an additive consisting of: 100 pt. BASE 3, 40 pt. CALCIUM SILICATE 1, (no CROSSLINKER, CATALYST) | 1087 kW/m$^2$ (133 sec) Peak Smoke = 4.9 | Fluffy Char |
| 1-8 | 95% PP/5% of an additive consisting of 100 pt. BASE 3, 80 pt. CALCIUM SILICATE 1, (no CROSSLINKER, CATALYST) | 1057 kW/m$^2$ (149 sec) Peak Smoke = 4.5 | Friable but more integrity. Could move the whole char but easily broken |
| 1-9 | 95% PP/5% of an additive consisting of: 100 pt. BASE 3, 60 pt. PDMS 1, 40 gm CALCIUM SILICATE 1, (no CROSSLINKER, no CATALYST) | 1024 kW/m$^2$ (141 sec) Peak Smoke = 4.5 | Friable but more integrity. Could move the whole char but easily broken |
| 1-10 | 95% PP/5% of an Additive consisting of: 100 gm BASE 3 80 gm CALCIUM SILICATE 1, no CROSSLINKER or CATALYST | 1169 kW/m$^2$ (135 sec) Peak Smoke = 5.0 | Char tougher and better than sample 1-9. Sticks to Aluminum tray |
| 1-11 | 95% PP/5% of an Additive consisting of: 100 pts BASE 3 90 pts PDMS 1 10 pts CALCIUM SILICATE 1, no CROSSLINKER or CATALYST | 1091 kW/m$^2$ (143 sec) Peak Smoke = 4.9 | More weight loss on burning resulted in less char than sample 1-8. |
| 1-12 | 60 gm PP 46.7 gm PDMS 1 93.3 gm CALCIUM SILICATE 1, CROSSLINKER, CATALYST | 179 kW/m$^2$ (300 sec) Peak Smoke = 2.3 | Top, white and ceramified, does not break easily, Bottom, white with no breaks, hard, not rubber |
| 1-13 | 106 gm LLDPE 93.3 gm CALCIUM SILICATE 1 | 269 kW/m$^2$ (571 sec) Peak Smoke = 1.8 | HRR had 2 peaks, second larger. Char very fluffy with NO structure. All PE burned, char was powder |
| 1-14 | 60 gm LLDPE 73 gm PDMS 1 67 gm CALCIUM SILICATE 1 CROSSLINKER, CATALYST | 158 kW/m$^2$ (215 sec) Peak Smoke = 2.0 | No cracks, lots of silica on top, white, hard ceramic nature; bottom, white, no burn; hard and not rubbery, no cracks |
| 1-15 | 60 gm LLDPE 90 gm PDMS 1 50 gm CALCIUM SILICATE 1 CROSSLINKER, CATALYST | 169 kW/m$^2$ (589 sec) Peak Smoke = 2.8 | Sample shrunk a bit. Hard char, slight cracks to bottom, 4–5 of them. Bottom tan but no sign of burn. |
| 1-16 | 60 gm LLDPE/ 120 gm PDMS 1 20 gm CALCIUM SILICATE 1 CROSSLINKER, CATALYST | 184 kW/m$^2$ (428 sec) Peak Smoke = 4.6 | Char breaks up easily, no significant structure but some, easy to break. |
| 1-17 | 60 gm LLDPE/90 gm BASE 2 50 gm CALCIUM SILICATE 2, CROSSLINKER, CATALYST | 224 kW/m$^2$ (427 sec) | Char is solid but breaks with handling |

TABLE 1-continued

Comparison of materials at 40 kW/m²

| Sample Ref. | Formulation | Peak/Peak Smoke HRR (sec) | Descriptive Result |
|---|---|---|---|
| 1-18 | 60 gm LLDPE/ 90 gm PDMS 1 50 gm CALCIUM SILICATE 1 CROSSLINKER, CATALYST | 227 kW/m² (421 sec) | Very tough char, no cracks to bottom, entire sample intact |

EXAMPLE 2

Several samples were made, varying the order of addition of Components (A) through (F), and comparing use of PDMS 1 and BASE 2. Samples were prepared in a 300 ml Haake internal mixer equipped with roller blades. These samples were tested in the cone calorimeter at 40 kW/m². The results are shown in Table 2. The physical properties of the materials are shown in Table 2a. Sample 1-5 was chosen for scale-up in the extruder based on the physical properties and the char characteristics.

TABLE 2

Order of addition compared at 40 kW/m²

| Sample Ref. | Formulation Crosslinker and catalyst in all samples | Peak/Peak Smoke HRR (sec) | Descriptive Result |
|---|---|---|---|
| 2-1 Order of addition, PDMS 1, LLDPE, CALCIUM SILICATE 1, CROSSLINKER, CATALYST | (30/70) 60 gm LLDPE/ 90 gm PDMS 1 50 gm Calcium Silicate 1 Crosslinker, catalyst | 138 kW/m² (147 sec) Peak Smoke = NA | char - hard - no cracks thru to bottom, good sample |
| 2-2 Order of addition, PDMS 1, CALCIUM SILICATE 1, LLDPE, CROSSLINKER, CATALYST | (30/70) 60 gm LLDPE/ 90 gm PDMS 1 50 gm CALCIUM SILICATE 1 CROSSLINKER, CATALYST | 153 kW/m² (174 sec) Peak Smoke = NA | char - hard - but system cracked thru to the bottom, but still tan bottom rather than black. Other examples with addition order were poorer. |
| 2-3 Order of addition, BASE 2, LLDPE, CALCIUM SILICATE 1, CROSSLINKER, CATALYST | (30/70) 60 gm LLDPE/ 90 gm BASE 2 50 gm CALCIUM SILICATE 1 CROSSLINKER, CATALYST | 160 kW/m² (609 sec) Peak Smoke = NA | char - hard - no large cracks, but small hairline cracks; tan on bottom, no burn thru, good sample |
| 2-4 Order of addition, BASE 2 CALCIUM SILICATE 1, LLDPE, CROSSLINKER, CATALYST | (30/70) 60 gm LLDPE/ 90 gm BASE 2 50 gm CALCIUM SILICATE 1 CROSSLINKER, CATALYST | 155 kW/m² (676 sec) Peak Smoke = NA | same as 2-3 |
| 2-5 Order of addition, BASE 2, LLDPE, CROSSLINKER, CATALYST, CALCIUM SILICATE 1 | (30/70) 60 gm LLDPE/ 90 gm BASE 2 50 gm CALCIUM SILICATE 1 CROSSLINKER, CATALYST | 175 kW/m² (720 sec) Peak Smoke = NA | Hard Char, no cracks thru to bottom, light tan bottom, no shrinkage. Very good sample |

TABLE 2a

| | Physical properties | | | | |
|---|---|---|---|---|---|
| Sample | 2-1 | 2-2 | 2-3 | 2-4 | 2-5 |
| Tensile (psi) | 611 | 673 | 1040 | 1319 | 1147 |
| Elongation (%) | 222 | 260 | 330 | 468 | 340 |
| Duro A | 83 | 83 | 88 | 86 | 89 |
| Duro D | 23 | 25 | 30 | 30 | 32 |

EXAMPLE 3

Sample 2-5 was chosen as a candidate for scale up on a 40 mm extruder. Trial 1 material was created to be similar to sample 2-5 above. Trial 2 was run as a candidate to be blended with Trial 1 by the customer for formulation sensitivity. Formulations scaled up in the extruder are listed in Table 3. Tests on Results from the samples at different heat flux rates are in Table 4.

A ZSK 40 mm extruder (Krupp Werner & Pfleiderer, Ramsey N.J.) with 10 barrel process sections was used to scale up the above formulations. Plastic pellets were loaded into barrel 1, CROSSLINKER injection at a rate of 0.24 kg per hour occurred in spacer at Barrel 2, BASE 2 was injected in Barrel 3 using a Bonnot extruder pump (Bonnot Co. Uniontown, Ohio 44685). A mixture of 9 parts by weight of a polydimethylsiloxane with viscosity of 1000 mPa·s at 25° C. to 1 part by weight CATALYST was injected at a rate of 0.24 kg per hour at a spacer after Barrel 5, the CALCIUM SILICATE 1 was injected at Barrel 7 using a side feeder Brabender ZSB-40 (CW Brabender, South Hackensack, N.J.). Zone 1 was not heated but Zones 2–10 were heated electrically to 160 C using water cooling to control the temperature. The exact barrel position is determined by the length and diameter of the extruder.

The addition of CALCIUM SILICATE 1 to TPSiV formulations having BASE 2 provides improved fire properties as measured by the Cone Calorimeter, ASTM 1354. It is expected that a wire would remain electrically communicating according to BS 6387 because the bottom of the cone sample remains relatively unaffected by the test.

TABLE 3

Formulations scaled-up in extruder with CATALYST and CROSSLINKER

| | Sample 2-5 | Trial 1 | | Trial 2 | | 50/50 mix of material from |
|---|---|---|---|---|---|---|
| | % | kg/hr | % | kg/hr | % | trial 1 and 2 |
| LLDPE | 30 | 19.04 | 45.5 | 8.46 | 30.5 | 38% |
| BASE 2 | 45 | 12.2 | 29.2 | 12.2 | 44.1 | 36.6% |
| CALCIUM SILICATE 1 | 25 | 10.6 | 25.3 | 7.05 | 25.1 | 25.2% |

TABLE 4

Results of formulations made in scale-up

| Sample Ref. | Cone Flux | Peak/Peak Smoke HRR (sec) | Descriptive Result |
|---|---|---|---|
| 4-1 Trial 1 material | 60 kW/m2 | 272 kW/m2 (299 sec) Peak Smoke = 3.0 | Hard char, some puff. Top char ablative, curls up and puffs up. Bottom tan, slight cracks-more on edge. Good char with some shrink |
| 4-2 Trial 2 material | 60 kW/m2 | 362 kW/m2 (349 sec) Peak Smoke = 2.9 | hard char, no cracks on top, minor very small cracks on bottom. No folding of sample. Tan to brown on sample underneath. |
| 4-3 50/50 blend of Trial 1 and Trial 2 materials | 60 kW/m2 | 346 kW/m2 (308 sec) Peak Smoke = 2.8 | Hard char - some puff - some shrink. Bottom tan to light - 2 minor cracks, good sample |
| 4-4 Trial 1 material | 75 kW/m2 | 327 kW/m2 (268 sec) Peak Smoke = 3.2 | hard char - ablative and hard - bottom tan, 1 major crack and 4 or 5 minor cracks. Edges friable but discounted due to high flux |
| 4-5 Trial 2 material | 75 kW/m2 | 365 kW/m2 (283 sec) Peak Smoke = 3.3 | hard char, minor shrink. Some breaks on bottom, tan to white color. |
| 4-6 50/50 blend of Trial 1 and Trial 2 material | 75 kW/m2 | 331 kW/m2 (280 sec) Peak Smoke = 3.2 | hard char, some puff. Bottom tan to brown, 1 crack near edge but only very minor cracks elsewhere. |
| 4-7 Trial 1 material | 88 kW/m2 | 326 kW/m2 (224 sec) Peak Smoke = 3.9 | ablative char, hard but ablative part fell off. Bottom, major cracks thru, tan to brown to black. |
| 4-8 Trial 2 material | 88 kW/m2 | 453 kW/m2 (289 sec) Peak Smoke = 3.9 | hard char, tan to brown on bottom. 1 major crack near edge but none elsewhere. Good sample. |
| 4-9 50/50 blend of Trial 1 and Trial 2 material | 88 kW/m$^2$ | 252 kW/m2 (260 sec) Peak Smoke = 3.8 | hard char, cracks at wire, tan to brown to deeper brown on bottom. Minor other cracks. Edge effects too. |

We claim:

1. A method of making a thermoplastic silicone vulcanizate comprising
   (I) mixing
      (A) 100 parts by weight of a thermoplastic polyolefin resin,
      (B) 5 to 350 parts by weight polyorganosiloxane having an average of at least 2 alkenyl radicals per molecule, and having a Williams plasticity of at least 30,
      (C) an organohydrido silicon compound which contains an average of at least 2 silicon-bonded hydrogen groups per molecule,
      (D) a hydrosilation catalyst,
      (E) optionally, a reinforcing filler, and
      (F) 10 to 170 parts by weight of calcium silicate, and
   (II) dynamically curing said polyorganosiloxane (B) using component (C) and component (D).

2. The method of claim 1 wherein the thermoplastic polyolefin resin is selected from polypropylene and polyethylene.

3. The method of claim 1 wherein the organohydrido silicon compound is added in an amount such that it provides 1 to 50 moles of silicon-bonded hydrogen for each mole of silicon-bonded alkenyl in Component (A).

4. The method of claim 1 wherein Component (E) is added at a rate of about 1 to 65 weight percent of the total weight of Component (B) plus Component (E).

5. The method of claim 1 wherein the calcium silicate is a wollastonite having a number average particle size of 2 to 30 micrometers and an aspect ratio greater than 3:1.

6. A thermoplastic silicone vulcanizate prepared by the method of claim 1.

7. A thermoplastic silicone vulcanizate prepared by the method of claim 2.

8. A thermoplastic silicone vulcanizate prepared by the method of claim 3.

9. A thermoplastic silicone vulcanizate prepared by the method of claim 4.

10. A thermoplastic silicone vulcanizate prepared by the method of claim 5.

11. A transmission media cable comprising a coating wherein said coating comprises the thermoplastic silicone vulcanizate of claim 6.

12. A transmission media cable comprising a coating wherein said coating comprises the thermoplastic silicone vulcanizate of claim 7.

13. A transmission media cable comprising a coating wherein said coating comprises the thermoplastic silicone vulcanizate of claim 8.

14. A transmission media cable comprising a coating wherein said coating comprises the thermoplastic silicone vulcanizate of claim 9.

15. A transmission media cable comprising a coating wherein said coating comprises the thermoplastic silicone vulcanizate of claim 10.

* * * * *